C. NOLAN.
WINDMILL.
APPLICATION FILED SEPT. 13, 1919.
1,416,052.
Patented May 16, 1922.
3 SHEETS—SHEET 1.
Fig. 1.
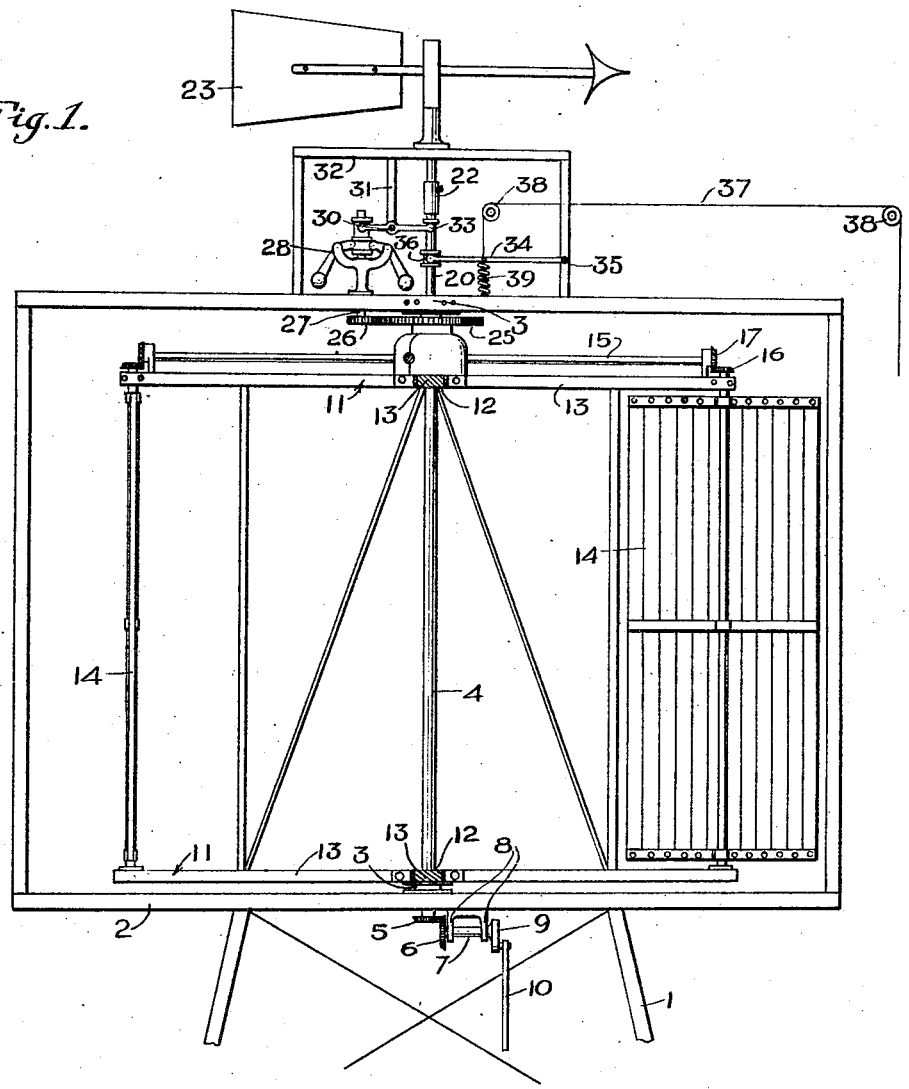
Inventor
Clyde Nolan,
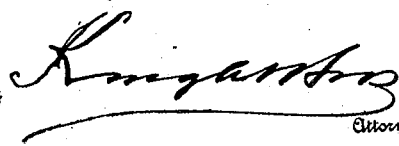
Attorneys

C. NOLAN.
WINDMILL.
APPLICATION FILED SEPT. 13, 1919.

1,416,052.

Patented May 16, 1922.
3 SHEETS—SHEET 2.

Inventor
Clyde Nolan,
By
Attorneys

C. NOLAN.
WINDMILL.
APPLICATION FILED SEPT. 13, 1919.
1,416,052.
Patented May 16, 1922.
3 SHEETS—SHEET 3.
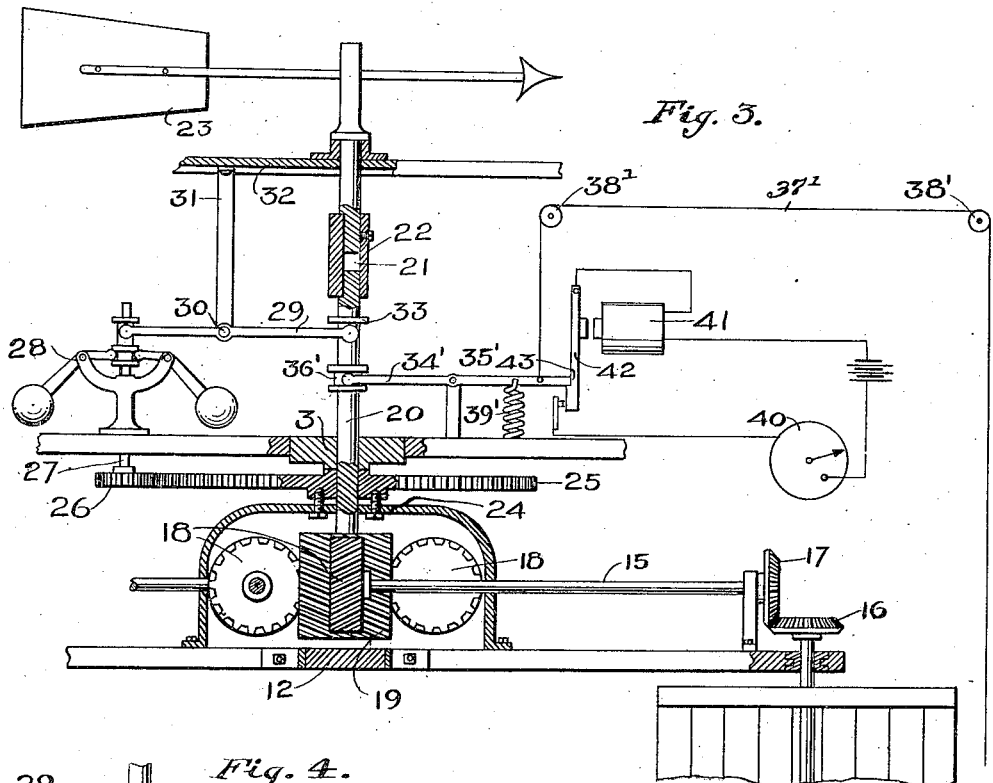
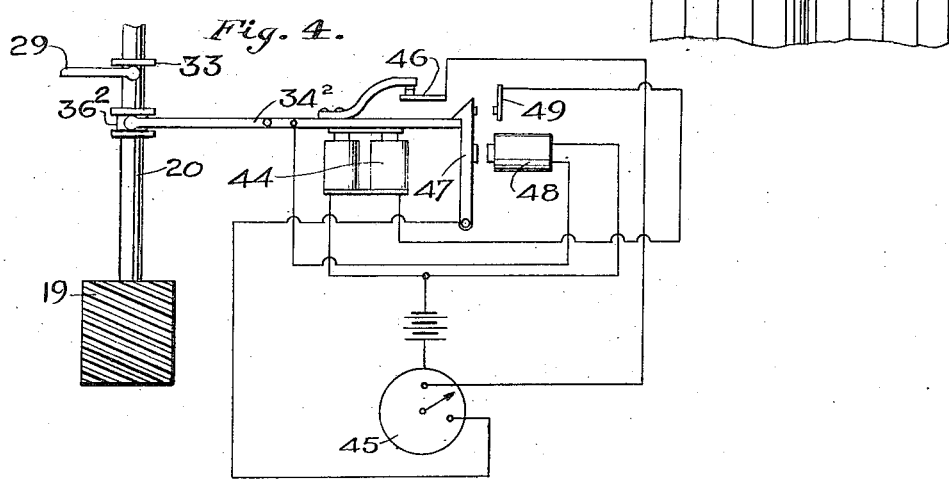
Inventor
Clyde Nolan,
By [signature]
Attorneys

UNITED STATES PATENT OFFICE.

CLYDE NOLAN, OF ELKHART, INDIANA, ASSIGNOR OF ONE-HALF TO B. F. WINTERHOFF, OF ELKHART, INDIANA.

WINDMILL.

1,416,052. Specification of Letters Patent. Patented May 16, 1922.

Application filed September 13, 1919. Serial No. 323,532.

*To all whom it may concern:*

Be it known that I, CLYDE NOLAN, a citizen of the United States, and a resident of Elkhart, in the county of Elkhart and State of Indiana, have invented certain new and useful Improvements in Windmills, of which the following is a specification.

This invention relates to wind mills, and has for its primary object to improve the operation of such devices, to which end the principal feature of the improvement consists in producing a novel manner of controlling the wind-propelled blades which impart the necessary drive to the pump rod or drive shaft.

In the accompanying drawings, the preferred embodiments of the invention are illustrated. In said drawings—

Fig. 1 is a side elevation of a wind mill, showing a mechanical control for the wind-propelled blades;

Fig. 3 is a side elevation, partly in section, of a modified or combined mechanical and electrical control for the wind-propelled blades;

Fig. 4 is a diagrammatical view of an electrical control; and

Figure 2:
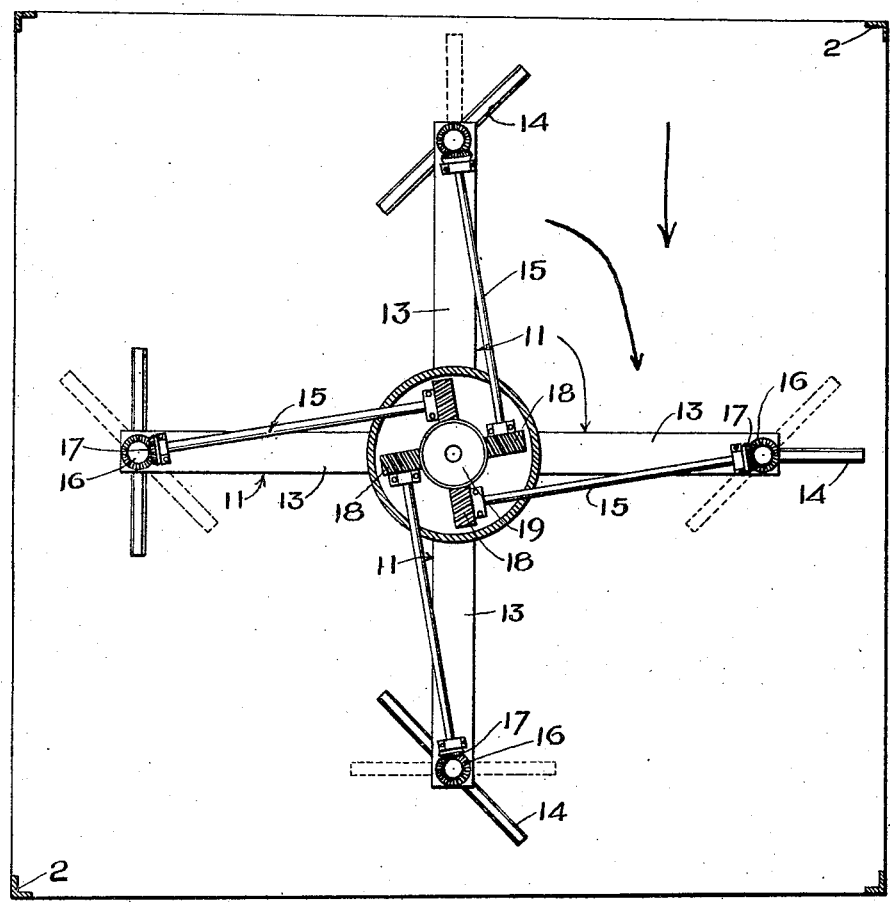
Fig. 2 is a plan view, looking down on the blade frame and its associated parts.

Referring now to the drawings by numerals of reference, 1 represents a part of the wind mill supporting structure, on which is mounted the blade frame 2, consisting of a rectangular skeleton frame having two suitable journal bearings 3 for the vertical rotatable shaft 4. The shaft 4 is provided with a driving gear 5 on its lower end, meshing with a driven gear 6 on the short horizontal shaft 7. The shaft 7 is suspended in suitable bearings 8 and provided with a crank arm 9 for imparting the necessary reciprocating motion to the pump rod 10, or, instead of a pump rod, to any other shaft to be driven. As stated, the shaft 4 is journaled in the frame 2, in which journals it is free to rotate. It is permanently fixed, however, in the blade spider 11, as at 12. This blade spider comprises a plurality of crossed arms 13, providing parallel supports for the wind blades 14, which are journaled in the outer ends of the arms. Each blade is provided with an individual shaft 15, in driving relation with its respective blade through the bevel gears 16 on the blade shaft meshing with the bevel gears 17 on the shaft 15. Each of the shafts 15 is provided on its inner end with gear 18, positioned around and adapted to mesh with a master gear 19, which is carried by the vertical shaft 20, so that the master gear 19, when reciprocated vertically, acts as a rack with relation to gear 18, and revolves shaft 15, thereby revolving blades 14 through their geared connection therewith, shaft 20 is divided, as at 21, by the collar 22, and having the weather vane 23 mounted on its free end. This divided shaft is so joined by the collar 22 as to compel the two sections to rotate in unison, but the lower section, which carries the master gear 19, is capable of vertical movement independent of the upper section. The blades are so adjusted with relation to the weather vane that when a blade support is immediately below and parallel to the arm of the weather vane, the blade carried thereby will be at an angle of 45° to the source of the wind, while the blade next thereto in the direction of rotation of the blade spider will have been turned by its geared connection with the master gear to an angle of 90° to the wind source, and the next blade in advance thereof will have been turned in the same manner to an angle of 45° to the wind source, though it will present the opposite deflecting position to that in which it was when directly beneath the arm of the weather vane, it having made a quarter of a revolution on its own axis through its geared connection with the master gear, and the next blade in the same order will have its edge to the wind source, it having made three-eighths of a revolution on its own axis through its geared connection with the master gear. These positions of the respective blades must necessarily follow, since the gears 18 are so adjusted with relation to the master gear 19 that one complete revolution of gear 18 around the master gear 19 will revolve shaft 15 and gears 16 and 17, and consequently, blade 14, one-half of one revolution, thereby causing one-eighth of a revolution of a blade in each 90° of its circuit, as in Fig. 2.

From the above it will be seen that so long as the master gear 19 is in normal position, or as shown in Fig. 3, the blades 14 will be in active position, and if sufficient wind is blowing the spider will impart the necessary pumping action. Now, one of the principal features of the invention resides in a governing means, whereby the blades may be either automatically thrown out of active position, or thrown out by manually manipulated means, or electrically controlled means, which means is so arranged as to throw the blades out of active position when they exceed a given velocity of revolution, and to permit them to again become active when the velocity of revolution has been reduced to a given rate. The automatic means, the manual means and the electrical means are all more or less cooperative; however, they will be described in the order named.

As stated, the two sections of the shaft 20 are so related as to permit vertical movement of the lower section, which carries the master gear 19, independent of the upper section, but they are adapted to rotate in unison. Mounted upon the gear casing 24, which in turn is fixed to and adapted to revolve with the frame 11, is a horizontal cog wheel 25, which is in a mesh with a cog wheel 26 carried by a shaft 27 of a centrifugal governor 28. This governor has an arm 29 fulcrumed, as at 30, to the hanger 31, which, in turn, is suspended from the platform 32. The outer end of the arm 29 is suitably engaged by a fixed flange 33 on the lower section of the shaft 20. Thus, when the speed of the spider reaches a certain number of R. P. M., the governor will act upon arm 29, causing it to act on the principle of a rack bar with relation to gears 18 and to push the lower section of the shaft 20 upward, and this will in turn cause the master gear 19 to accelerate rotation of the shafts 15 of the blades 14 which will turn them with their broad surfaces out of the wind. The speed of the spider will determine the amount of vertical movement of the master gear, which will determine the degree of deflection of the blades. It may be only enough to create a slight deflection of the blades, in which event the blades will continue to revolve the spider, but at a decreased speed.

The master gear may be manually operated by means of lever 34, which is fulcrumed, as at 35, with its inner end in contact with sleeve 36 on shaft 20, and has cable 37 running over pulleys 38 attached thereto, which may be drawn by the hand to raise master gear 19 against the tension of spring 39, which spring tends to hold the master gear 19 in normal working position.

One form of electrical control is shown in Fig. 3, as associated with a slightly modified form of manually operated means. This form consists in fulcruming the horizontal arm 34' at 35', with one end contacting with a fixed sleeve 36' underlying the flange thereon, and with its opposite end connected to the pull cable 37', which, as in Fig. 1, rides over a series of pulleys 38' and terminates as does the end of cable 37. Only, the cable in this form is used in a reverse manner; that is, by pulling on its end it will cause the master gear to be lowered, instead of raised as in Fig. 1, which lowering of the master gear 19 will impart rotation to the shafts 15 of the blades 14 and turn the blades with their broad surfaces out of the wind. Also, in this form a contractile spring 39' has a normal tendency to raise the gear by an upward thrust on the end of the arm 34'. In this form the end of the arm 34' is shown as associated with an electrical arrangement, which is under control of a circuit controller 40, in circuit with a magnet 41 and its armature 42, the armature providing a catch, as at 43, for the inner end of the arm 34'. When the catch is in position as shown, it will prevent the action of the spring 39' imparting an upward thrust of the arm, and thus prevent the master gear 19 being raised. When the magnet is energized the catch will be released and will free the arm to act under the influence of the spring and raise the master gear, which results in turning the blades over their broad surfaces out of the wind, as previously set forth, with relation to Fig. 1.

Another electrical control is shown in Fig. 4. In this embodiment the control is wholly electrical, except, of course, that the governor 28 is still employed, but there is no manual operating means. In this form the arm $34^2$ has an engagement with a fixed sleeve $36^2$; it is fulcrumed, as shown, with its outer end associated with a pair of magnets 44, and adapted to act in the capacity of an armature, to which end it is in circuit with a switch or circuit controller 45 and the magnets 44. Magnets 44, when energized, will draw the outer end of the arm $34^2$ downwardly and thus raise its opposite end, which, with its engagement with the fixed sleeve $36^2$, will raise the master gear 19 and operate the meshing gears 18 and the blades 14, as heretofore described. When the arm is thus influenced, it is maintained in this position by the catch or lever 47. When magnet 48 is energized, the catch 47 will release the arm $34^2$ and permit the master gear to drop to the position occupied before the arm $34^2$ was manipulated to raise it. The contacts 46 and 49 are employed to complete the circuit, when the magnet 44 is inactive, through the circuit controller 45.

Figure 5:
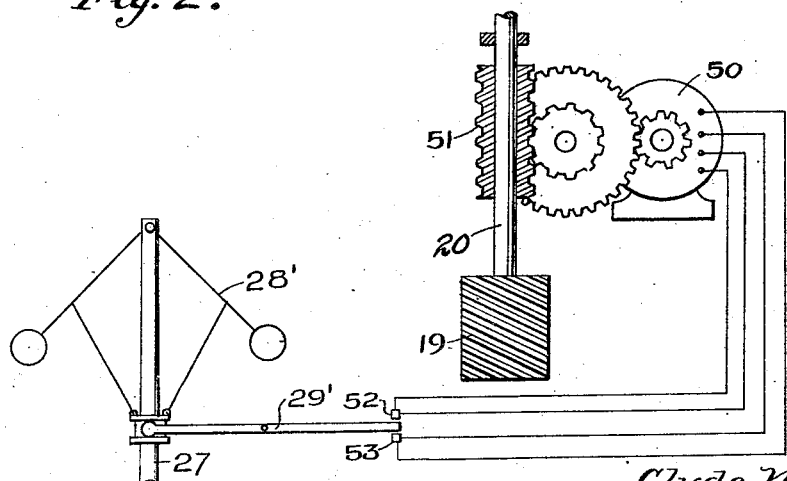
Fig. 5 is a diagrammatical view of still another form of electrical control.

Still another form of electrical control is shown in Fig. 5. In this embodiment the governor arm 29' acts as a circuit controller, but the governor 28' is driven, as in the other embodiments, by the shaft 27 and the gears 26 and 25. Furthermore, a motor 50, geared to the elongated gear 51, fixed on the lower section of the shaft 20, is employed to raise and lower the master gear 19. The motor is controlled by the circuit breaker arm 29' of the governor 28'. Thus, it will be seen that with the arm 29' normally between the pole pieces 52 and 53, as shown, the motor will be inactive. The arm will assume this inactive position so long as the spider revolves at the proper speed. The speed of the spider is of course controlled by the position of the blades 14. Should the speed of the spider increase above normal, the governor will cause the arm to close the circuit at 53, thus throwing in the motor, which will adjust the master gear 19, and likewise the blades 14. On the other hand, should the speed of the spider decrease below normal, the governor will again be called on to close the opposite circuit 52, whereupon the master gear will be adjusted, likewise the blades. In the latter instance, the decreased speed of the spider would be brought about by the blades being not fully exposed to the wind; the adjustment of the master gear would insure proper exposure of the board surface of the blades into the wind.

The circuit for the electrical control in Fig. 3 may be closed in any convenient manner, either by hand or by a float in the tank, which is supplied with water from the pump to which the wind mill is attached.

Assuming that the wind is blowing from the north, as indicated by the pointer in Fig. 2, the blade spider will revolve from left to right, as indicated by the arrow, which will revolve the individual blades from left to right, as indicated by arrow, through their geared connection with the master gear, thereby keeping their broad sides so turned with relation to the wind as to transmit to the shaft 4 the fullest possible wind power. Now, assuming that the velocity of the wind is sufficient to revolve the blade spider more than the predetermined R. P. M., the governor, through its action on arm 29, will raise the master gear upwardly, which will cause an additional or accelerated revolution of shaft 15, thereby accelerating the rotation of blades 14 on their axis in such manner as to present less of their broad sides to the wind, which will reduce the number of R. P. M. of the blade spider when retractile spring 39 (Fig. 1) will exert a downward pull on the master gear 19 through arm 34 and sleeve 36, thus restoring the master gear to its normal position and throw the blades back to their normal position.

While in Fig. 3 I have shown manual means, in the form of a cable, for throwing the master gear 19 downwardly, and thereby throwing the blades 14 with less of their broad sides to the wind and slowing down the revolution of the blade spider, in this case spring 39' will exert an upward force on the master gear through arm 34' and sleeve 36', thus restoring the master gear to its normal position and throwing the blades 14 back into their normal position.

In Fig. 5 the reciprocal movement of the master gear 19 is controlled by electrical means.

Claims.

1. In a speed control device for wind mills, a master gear, a plurality of gears meshing therewith, each of said meshing gears having a shaft, and a wind blade geared to each of said shafts, said master gear being capable of rotation and reciprocation without disengaging said meshing gears and so constructed as to impart rotation to each of said shafts when rotated or reciprocated, whereby the angle of wind deflection of said blades may be changed.

2. In a speed control device for wind mills as set forth in claim 1, in which the reciprocation of the master gear is controlled by a centrifugal governor.

3. In a speed control device for wind mills as set forth in claim 1, in which the reciprocation of the master gear is controlled by a centrifugal governor and the rotation thereof controlled by a weather vane.

CLYDE NOLAN.